(12) United States Patent
Sakata et al.

(10) Patent No.: US 8,852,852 B2
(45) Date of Patent: *Oct. 7, 2014

(54) NARROW FRAME TOUCH INPUT SHEET, MANUFACTURING METHOD OF SAME, AND CONDUCTIVE SHEET USED IN NARROW FRAME TOUCH INPUT SHEET

(71) Applicant: Nissha Printing Co., Ltd., Kyoto (JP)

(72) Inventors: Yoshihiro Sakata, Kyoto (JP); Takao Hashimoto, Kyoto (JP); Yoshihiro Kai, Kyoto (JP); Yuji Morikawa, Kyoto (JP)

(73) Assignee: Nissha Printing Co., Ltd., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/016,584

(22) Filed: Sep. 3, 2013

(65) Prior Publication Data

US 2014/0001148 A1 Jan. 2, 2014

Related U.S. Application Data

(62) Division of application No. 13/318,088, filed as application No. PCT/JP2010/065374 on Sep. 8, 2010, now Pat. No. 8,581,871.

(30) Foreign Application Priority Data

| Sep. 11, 2009 | (JP) | 2009-211002 |
| Sep. 16, 2009 | (JP) | 2009-215087 |
| Sep. 16, 2009 | (JP) | 2009-215088 |

(51) Int. Cl.
 G03F 7/20 (2006.01)
 G06F 3/044 (2006.01)

(52) U.S. Cl.
 CPC ...... *G06F 3/044* (2013.01); *G06F 2203/04103* (2013.01)
 USPC ........................................ 430/313

(58) Field of Classification Search
 USPC .......................... 430/311, 313, 320
 See application file for complete search history.

(56) References Cited

U.S. PATENT DOCUMENTS

| 6,555,209 B1 | 4/2003 | Yoshimura et al. |
| 2007/0212619 A1 | 9/2007 | Yoshikawa et al. |

(Continued)

FOREIGN PATENT DOCUMENTS

| CN | 101082768 A | 12/2007 |
| JP | 05-108264 A | 4/1993 |

(Continued)

OTHER PUBLICATIONS

International Search Report of corresponding International Application No. PCT/JP2010/065374, dated on Dec. 14, 2010.
An Office Action of corresponding Taiwanese Patent Application No. 099130575, issued on Feb. 13, 2012.
An Office Action of corresponding U.S. Appl. No. 13/318,088, issued on Apr. 16, 2013.

*Primary Examiner* — Brittany Raymond
(74) *Attorney, Agent, or Firm* — Global IP Counselors, LLP

(57) ABSTRACT

A method for manufacturing a narrow frame touch input sheet includes forming and stacking transparent conductive films, light-excluding conductive electrode films, and first resist layers sequentially on both surfaces of a transparent base sheet, exposing and developing the first resist layers simultaneously on the both surfaces, etching the transparent and light-excluding conductive electrode films on the both surfaces, and stripping the first resist layers to form a fine wiring circuit pattern with the stacked transparent conductive film and light-excluding conductive electrode film in an outer edge portion on each of the two surfaces. The method further includes forming a second resist layer to cover the fine wiring circuit pattern on each surface, and etching only the light-excluding electrode conductive film layer on which the second resist layer is not formed, to expose a circuit pattern of the transparent conductive film in a central window portion on each surface.

20 Claims, 5 Drawing Sheets

(56) References Cited

U.S. PATENT DOCUMENTS

| | | |
|---|---|---|
| 2008/0176042 A1 | 7/2008 | Nashiki et al. |
| 2009/0096759 A1 | 4/2009 | Nishiwaki et al. |
| 2009/0303195 A1 | 12/2009 | Yamato et al. |
| 2010/0261099 A1 | 10/2010 | Yoshikawa et al. |
| 2011/0141059 A1 | 6/2011 | Nishiki et al. |
| 2012/0024816 A1 * | 2/2012 | Huang et al. .................. 216/13 |

FOREIGN PATENT DOCUMENTS

| | | |
|---|---|---|
| JP | 2008-065748 A | 3/2008 |
| JP | 2009-076432 A | 4/2009 |
| WO | 2007/144993 A1 | 12/2007 |
| WO | 2008/032476 A1 | 3/2008 |

* cited by examiner

NARROW FRAME TOUCH INPUT SHEET, MANUFACTURING METHOD OF SAME, AND CONDUCTIVE SHEET USED IN NARROW FRAME TOUCH INPUT SHEET

CROSS-REFERENCE TO RELATED APPLICATIONS

This application is a divisional of prior application Ser. No. 13/318,088, filed on Oct. 28, 2011, which is a U.S. National stage application that claims priority under 35 U.S.C. §119(a) to Japanese Patent Application No. 2009-211002, filed in Japan on Sep. 11, 2009, to Japanese Patent Application No. 2009-215087, filed in Japan on Sep. 16, 2009 and to Japanese Patent Application No. 2009-215088, filed in Japan on Sep. 16, 2009, the entire contents of U.S. patent application Ser. No. 13/318,088, Japanese Patent Application No. 2009-211002, Japanese Patent Application No. 2009-215087 and Japanese Patent Application No. 2009-215088 are hereby incorporated herein by reference.

BACKGROUND

1. Field of the Invention

The present invention relates to a narrow frame touch input sheet, a method for manufacturing the same, and a conductive sheet used in the narrow frame touch input sheet, which are suitable for a capacitive touch sensor having a narrow frame and two layers of transparent conductive film patterns.

2. Background Information

Conventionally, as disclosed in JP-A-108264, there exists an invention for forming a touch input device, in which metal films are formed on terminals of the lead line of transparent electrodes, and then a transparent electrode pattern in an input panel area, the metal films of the terminals of the lead line, and the transparent electrodes are etched simultaneously.

The invention described in JP-A-108264 is concerned with a method including the following steps as illustrated in FIG. 7. A transparent electrode made of ITO film 31 is formed on a polyester film 30, and a photoresist film 32 is formed and patterned thereon. Next, after covering the photoresist film 32 with a mask 33, a metal film 34 made of indium is formed. Then, the mask 33 is removed, and the photoresist film 32 is stripped using a resist stripping liquid so that the metal film 34 is patterned. After that, a second photoresist film 35 is formed and patterned on the patterned metal film 34 (see FIG. 7(e)), and the metal film 34 and the ITO film 31 are etched and removed simultaneously using ferric chloride solution or the like. Finally, the photoresist film 35 is stripped using the resist stripping liquid.

SUMMARY

However, the method of JP-A-108264 has a problem that if the position of the mask 33 is shifted by even a little, when the second photoresist film 35 is formed and patterned on the patterned metal films 34 as illustrated in FIG. 7(e), one of metal films 34 becomes thin while the other metal film 34 becomes thick so that desired resistance of the metal film 34 cannot be obtained. Therefore, the method cannot be applied to a narrow frame touch input sheet in which the metal film 34 is thin and is required to have a resistance within a predetermined range.

In addition, as to a capacitive touch input sheet, it is usually necessary to stack a transparent conductive film pattern formed in the X direction and a transparent conductive film pattern formed in the Y direction via an insulation layer between them. Because the metal film and the transparent electrode cannot be formed in alignment on both surfaces with each other by the method described in JP-A-108264, there is a problem that it is necessary to manufacture two touch input sheets and to glue them together in alignment. As a result, there is also a problem that the productivity is lowered and that transmittance of a transparent window portion is decreased or thickness thereof is increased.

Therefore, an object of the present invention is to solve the above-mentioned problem and to provide a narrow frame touch input sheet, a method for manufacturing the same, and a conductive sheet used in the narrow frame touch input sheet, which are suitable for a capacitive touch sensor having a narrow frame and two layers of transparent conductive film patterns.

Accordingly, a disclosed embodiment provides a method for manufacturing a narrow frame touch input sheet, comprising forming and stacking transparent conductive films, light-excluding conductive electrode films, and first resist layers sequentially on both surfaces of a transparent base sheet, exposing and developing the first resist layers simultaneously on the both surfaces, and etching the transparent conductive films and the light-excluding conductive electrode films on the both surfaces. The method further includes stripping the first resist layers so as to form a fine wiring circuit pattern with the stacked transparent conductive film and light-excluding conductive electrode film in an outer edge portion on each of the two surfaces of the base sheet, forming a second resist layer to cover the fine wiring circuit pattern on each surface of the base sheet, and etching only the light-excluding electrode conductive film layer on which the second resist layer is not formed, so that a circuit pattern of the transparent conductive film is exposed in a central window portion on each surface of the base sheet.

In the method, the etching can etch the transparent conductive films and the light-excluding conductive electrode films on the both surfaces simultaneously. The method can also include forming a design pattern layer onto the second resist layer after the circuit pattern is exposed, as well as removing the second resist layer after the circuit pattern is exposed. The method can further include adhering a transparent protection film to the circuit pattern in the central window portion on each surface of the base sheet after the circuit pattern is exposed, and adhering the transparent protection film to the fine wiring circuit pattern on each surface of the base sheet.

Another disclosed embodiment provides a method for manufacturing a narrow frame touch input sheet, comprising forming and stacking a transparent conductive film, a light-excluding conductive electrode film, and a first resist layer sequentially on each of two transparent base sheets, stacking the base sheets to be opposite to each other so that the transparent conductive films, the light-excluding conductive electrode films, and the first resist layers are formed on both surfaces of the stacked base sheets, and exposing and developing the first resist layers simultaneously on the both surfaces. The method also includes etching the transparent conductive films and the light-excluding conductive electrode films on the both surfaces, and stripping the first resist layers so as to form a fine wiring circuit pattern with the sequentially stacked transparent conductive film and light-excluding conductive electrode film in an outer edge portion on each of the two surfaces of the stacked base sheets. The method further includes forming a second resist layer to cover the fine wiring circuit pattern on each surface of the stacked base sheets, and etching only the light-excluding conductive electrode film layer in a central window portion on which the second resist layer is not formed on each surface of the stacked base sheets, so that a circuit pattern of the transparent conductive film is exposed.

As in the previously described embodiment, in this method, the etching can etch the transparent conductive films and the light-excluding conductive electrode films on the both surfaces simultaneously. The method can also include forming a design pattern layer onto the second resist layer after the circuit pattern is exposed, and removing the second resist layer after the circuit pattern is exposed. The method can further include adhering a transparent protection film to the circuit pattern in the central window portion on each surface of the stacked base sheets after the circuit pattern is exposed, and adhering the transparent protection film to the fine wiring circuit pattern on each surface of the stacked base sheets.

The narrow frame touch input sheet and the manufacturing method thereof according to the disclosed embodiments are characterized in that the transparent conductive film of the conductive sheet and the light-excluding conductive electrode film are etched simultaneously, and the fine wiring circuit pattern is formed in the outer edge portion in which the transparent conductive film and the light-excluding conductive electrode film are stacked sequentially with the same pattern without misalignment. After that, the second resist layer is formed to cover the fine wiring circuit pattern, and only the light-excluding conductive electrode film layer on which the second resist layer is not formed is etched so that the circuit pattern of the transparent conductive film is exposed in the central window portion. Therefore, a delicate and fine wiring circuit pattern can be formed, and that the touch input sheet having a very narrow frame can be manufactured.

In addition, the step of forming the second resist layer that requires alignment can be performed with alignment accuracy such that the fine wiring circuit pattern in the outer edge portion can be covered. Therefore, the narrow frame touch input sheet can be obtained with high productivity.

Furthermore, the narrow frame touch input sheet and the manufacturing method thereof according to the present invention are characterized in that the circuit pattern and the fine wiring circuit pattern of the transparent conductive film are formed on both surfaces of the base sheet. Further, the narrow frame touch input sheet of the present invention is characterized in being a capacitive type. Therefore, the capacitive narrow frame touch input sheet can be manufactured, in which the circuit pattern and the fine wiring circuit pattern of the XY transparent conductive films are formed using only one base sheet as a core.

Also, because the structure can be composed of only one base sheet as a core, the capacitive type narrow frame touch input sheet with a high transparency and small thickness can be manufactured.

Furthermore, the narrow frame touch input sheet and the conductive sheet of the present invention are characterized in that the light-excluding conductive electrode film layer is constituted of a copper foil having a thickness of 20 to 1000 nm. Therefore, because of the good electrical conductivity of the conductive electrode film layer, the narrow frame touch input sheet having good responsiveness can be manufactured efficiently.

In addition, because of the high light-excluding property of the conductive film layer for an electrode, when the first resist layers on both surfaces are patterned simultaneously through exposing and the like, the exposing light beam can be effectively prevented from reaching the first resist layer on the opposite surface. Therefore, the narrow frame touch input sheet having the circuit patterns and the fine wiring circuit patterns formed on both surfaces of the base sheet can be manufactured with high productivity and high quality.

BRIEF DESCRIPTION OF THE DRAWINGS

Referring now to the attached drawings which form a part of this original disclosure.

DETAILED DESCRIPTION OF EMBODIMENTS

Hereinafter, best embodiments of the present invention will be described with reference to the drawings.

(First Embodiment)

Figure 1:
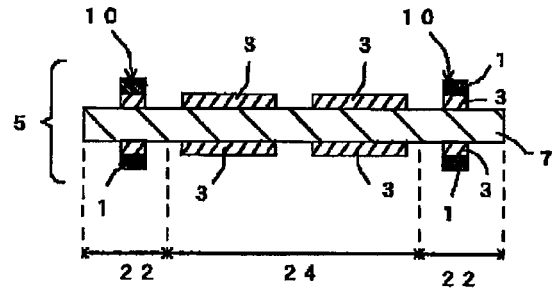
FIG. 1 is a schematic cross sectional view illustrating an example of a narrow frame touch input sheet according to the present invention, in which circuit patterns and fine wiring circuit patterns are formed on front and rear surfaces of a single transparent base sheet.

Hereinafter, the present invention will be described in detail with reference to the drawings. FIG. 1 is a schematic cross sectional view illustrating an example of a narrow frame touch input sheet as a capacitive touch sensor according to the present invention, in which circuit patterns and fine wiring circuit patterns are formed on both surfaces, i.e. on front and rear surfaces, of a single transparent base sheet. FIGS. 2(a) to 2(f) are schematic cross sectional views illustrating steps of manufacturing the capacitive touch sensor. In the figures, reference numeral 1 denotes a light-excluding conductive electrode film layer, reference numeral 3 denotes a transparent conductive film, reference numeral 5 denotes a narrow frame touch input sheet, reference numeral 7 denotes a base sheet, reference numeral 10 denotes a fine wiring circuit pattern, numeral 12 denotes a mask, reference numeral 14 denotes an exposing light beam, reference numeral 16 denotes a first resist layer, reference numeral 18 denotes a second resist layer, reference numeral 20 denotes a capacitive touch sensor, reference numeral 22 denotes an outer edge portion of the narrow frame touch input sheet 5, reference numeral 24 denotes a central window portion of the narrow frame touch input sheet 5, and reference numeral 28 denotes an external circuit.

The narrow frame touch input sheet 5 of the present invention has the following structure. In the central window portion 24 on the base sheet 7, a circuit pattern of a transparent conductive film 3 is formed. In the outer edge portion 22, a fine wiring circuit pattern 10 is formed in which the transparent conductive film 3 and a light-excluding conductive electrode film 1 are stacked sequentially. The narrow frame touch input sheet 5 has a feature that the transparent conductive film 3 and the light-excluding conductive electrode film 1 of the fine wiring circuit pattern 10 are formed and stacked in the same pattern without misalignment. Further, the circuit pattern and the fine wiring circuit pattern 10 of the transparent conductive film 3 can be formed on both surfaces of a single transparent base sheet (see FIG. 1).

A method for manufacturing the above-mentioned narrow frame touch input sheet 5, in which the circuit pattern and the fine wiring circuit pattern 10 of the transparent conductive film 3 are formed on both surfaces of a single transparent base sheet, includes the following steps. First, the transparent conductive films 3, the light-excluding conductive electrode films 1, and first resist layers 16 are formed sequentially along the entire surface of both front and rear surfaces of a single transparent base sheet 7, so that a conductive sheet (see FIG. 2(a)) is obtained. After that, masks 12 of desired patterns are placed on both the front and rear surfaces, and the first resist layers 16 are patterned by exposing and developing (see FIG. 2(b)). In this case, the light-excluding conductive electrode film 1 on one side blocks an exposing light beam 14 from the other side. Therefore, when both surfaces are exposed simultaneously using different mask patterns, the pattern of the first resist layer 16 on one side has no influence on the pattern of the first resist layer 16 on the opposite side. Therefore, because both surfaces can be exposed simultaneously, alignment between the first resist layers 16 on the front and rear surfaces can be performed easily, and both surfaces can be patterned in a single step so that productivity can be improved.

Note that the alignment between a front mask and a rear mask can be performed using a known mask alignment method for a double-sided exposure apparatus. For instance, mask alignment marks are formed on each of the front mask and the rear mask, and an optical read sensor such as a camera reads a superposed state of a pair of mask alignment marks, so that relative positional information between the front mask and the rear mask can be obtained. Then, based on the obtained positional information, a mask position adjustment mechanism moves the front mask and the rear mask relatively to each other so that centers of the mask alignment marks are overlapped with each other, thereby aligning the front mask and the rear mask with each other.

Figure 2A:
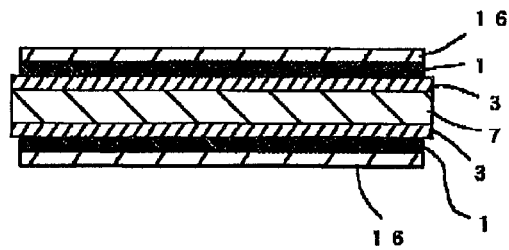
FIG. 2(a) is a schematic diagram illustrating a step of manufacturing the narrow frame touch input sheet.
Figure 2B:
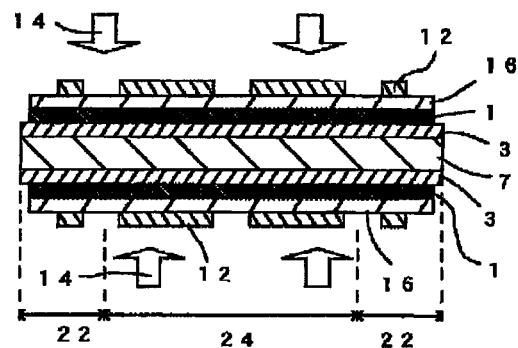
FIG. 2(b) is a schematic diagram illustrating a step of manufacturing the narrow frame touch input sheet.
Figure 2C:
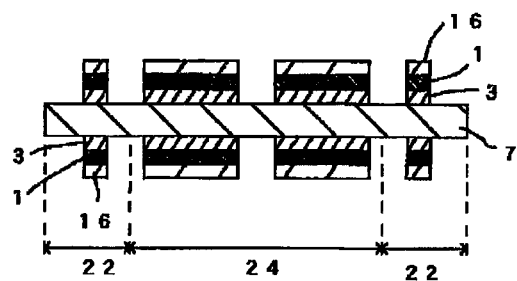
FIG. 2(c) is a schematic diagram illustrating a step of manufacturing the narrow frame touch input sheet.
Figure 2D:
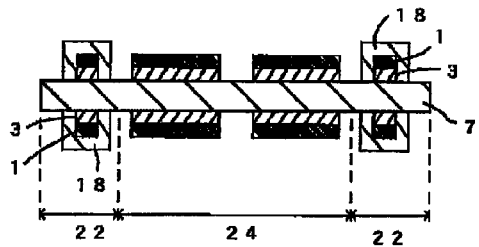
FIG. 2(d) is a schematic diagram illustrating a step of manufacturing the narrow frame touch input sheet.
Figure 2E:
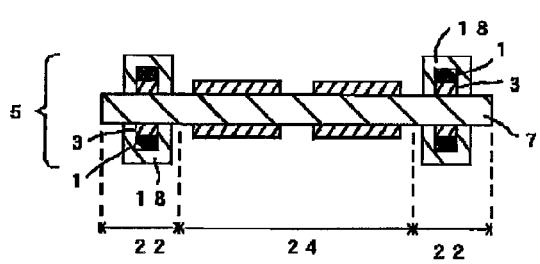
FIG. 2(e) is a schematic diagram illustrating a step of manufacturing the narrow frame touch input sheet.

Next, the transparent conductive film 3 and the light-excluding conductive electrode film 1 are simultaneously etched using etching liquid such as ferric chloride, so that a thin line pattern is formed (see FIG. 2(c)). Next, the first resist layer 16 is stripped using the resist stripping liquid so that the light-excluding conductive electrode film 1 is exposed. After that, a second resist layer 18 is formed only on the exposed light-excluding conductive electrode film 1 along the outer edge portion 22 (see FIG. 2(d)). It is sufficient as long as the second resist layer 18 covers the light-excluding conductive electrode film 1 of the outer edge portion 22 along with the transparent conductive film 3. Therefore, the second resist layer 18 is not required to be aligned so precisely. For this reason, there is little defect when the second resist layer 18 is formed, and productivity is improved.

Next, etching is performed using a special etching liquid such as acidified hydrogen peroxide. Then, the outer edge portion 22, on which the second resist layer 18 is formed, remains as is, while the light-excluding conductive electrode film 1 in the central window portion 24, in which the second resist layer 18 is not formed and the light-excluding conductive electrode film 1 is exposed, is removed by the etching so that the transparent conductive film 3 thereunder is exposed (see FIG. 2(e)). The central window portion 24 becomes a display portion in which transparent conductive films are formed on both surfaces, while the light-excluding conductive electrode film 1 formed in the outer edge portion 22 and the transparent conductive film 3 formed thereunder with the same pattern become the fine wiring circuit pattern 10. Note that if the transparent conductive film 3 is made of an amorphous material, it is preferred to have the material crystallized by means of heat treatment before the etching. It is because crystallization improves etching resistance, so that only the light-excluding conductive electrode film 1 can selectively be etched more easily.

Figure 2F:
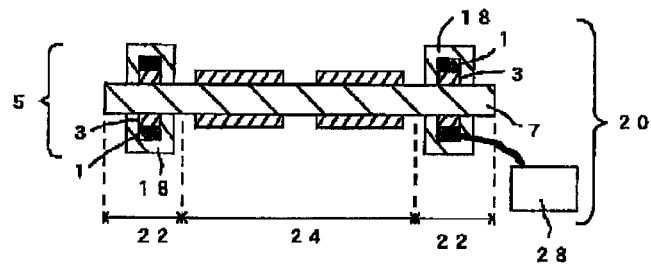
FIG. 2(f) is a schematic diagram illustrating a step of manufacturing the narrow frame touch input sheet.

The end portion of the fine wiring circuit pattern 10 formed on both surfaces of the narrow frame touch input sheet 5 by the method described above is connected to an external circuit 28 that includes IC chips, and thus the capacitive touch sensor 20 having the transparent conductive films 3 formed on both surfaces of the base sheet 7 is manufactured (see FIG. 2(f)).

Figure 8:
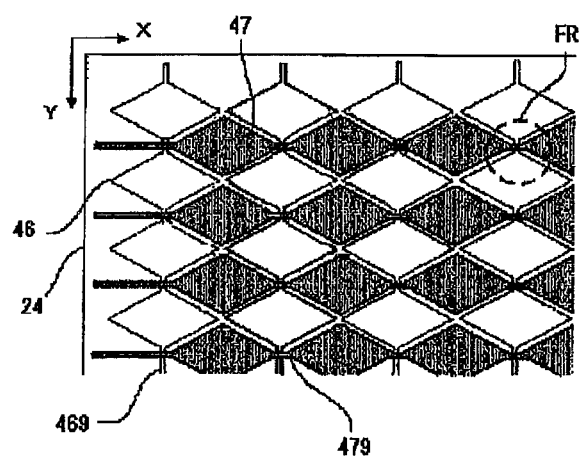
FIG. 8 is a plan view illustrating an example of shape and arrangement of the circuit pattern formed in a central window portion of the narrow frame touch input sheet.

Here, the circuit pattern formed in the central window portion 24 of the capacitive touch sensor 20 will be additionally described. In the schematic cross sectional view of the narrow frame touch input sheet 5 attached to this specification, the circuit pattern has been simplified. In actual practice, the circuit pattern is different between the front and rear surfaces. For instance, as illustrated in FIG. 8, the rear side of the base sheet 7 is provided with a plurality of rhombus electrodes 46 having a rhombic shape in plan view and a connection wiring 469 that passes through the rhombus electrodes 46 in the vertical direction (Y direction) in the figure. The plurality of rhombus electrodes 46 and the connection wiring 469 are electrically connected to each other. In addition, sets of the connection wiring 469 and the plurality of rhombus electrodes 46 are arranged in a repeating pattern in the lateral direction (X direction) in the figure. On the other hand, in the same manner, the front side of the base sheet 7 is provided with a plurality of rhombus electrodes 47 and a connection wiring 479 that passes through the rhombus electrodes 47. However, in this case, the extending direction of the connection wiring 479 is different from that of the connection wiring 469 and is the lateral direction (X direction) in the figure. In addition, sets of the connection wiring 479 and the plurality of rhombus electrodes 47 are arranged in a repeating pattern in the vertical direction (Y direction) in the figure. Further, as can be understood from FIG. 8, the rhombus electrodes 46 are arranged to fill gaps formed between the connection wirings 479, while the rhombus electrodes 47 are arranged to fill gaps formed between the connection wirings 469. Further as illustrated in FIG. 8, the rhombus electrodes 46 and the rhombus electrode 47 are arranged complementarily. In other words, the rhombus electrodes 47 are arranged so as to fill rhombic gaps that are formed as a result of the rhombus electrodes 46 being arranged as a matrix. As described above, according to the present invention, the light-excluding conductive electrode film 1 on one side blocks the exposing light beam 14 from the other side. Therefore, when both surfaces are exposed simultaneously, the pattern of the first resist layer 16 on one side has no influence on the pattern of the first resist layer 16 on the opposite side. Thus, different circuit patterns can be formed on the front and rear surfaces.

Because the X direction electrodes and the Y direction electrodes are arranged so as to form a lattice, if a finger or the like of a user touches any position on the lattice (for example, a position indicated by the broken line circle FR), a capacitor is formed between the finger or the like and the X direction electrode in contact. In addition, a capacitor is formed between the finger or the like and the Y direction electrode in contact. The formation of the capacitors increases the capacitances of the X direction electrode and the Y direction electrode. A position detection unit of the external circuit 28 detects a variation of the capacitance generated in this case, and further detects the X direction electrode and the Y direction electrode having the maximum capacitance, so that a set of X coordinate and Y coordinate can be obtained as specific values indicating the position that is touched in the central window portion 24.

Next, individual layers constituting the above-mentioned narrow frame touch input sheet 5 will be described in detail.

First, the base sheet 7 is made of a transparent sheet having a thickness of approximately 30 to 2000 μm, and the material thereof is a plastic film such as polyester resin, polystyrene resin, olefin resin, polybutylene terephthalate resin, polycarbonate resin, acrylic resin, or the like, or a glass material.

Here, when the base sheet 7 of the conductive sheet is a plastic film, a problem of film elongation may occur. For this reason, it is preferred to pattern the first resist layers 16 on both surfaces of the conductive sheet by simultaneous exposure of both surfaces. It is because, if the patterning of the first resist layers 16 is preformed by exposing one surface at a time, the following problem will occur. When the patterning of one side is finished and the conductive sheet is turned over to be set into the exposing device again, if the base sheet 7 is elongated, a misalignment occurs between the circuit patterns on the front surface and the rear surface. In the example illustrated in FIG. 8, because the rhombus electrodes 46 and the rhombus electrodes 47 are arranged in a complementary relationship, if a misalignment occurs between the circuit patterns on the front surface and the rear surface, the correct function of the capacitive touch sensor 20 cannot be achieved.

As the light-excluding conductive electrode film layer 1, a single metal film having high electrical conductivity and good light-excluding property may be used or a layer made of an alloy or compound of the metal may be used. The light-excluding conductive electrode film layer 1 can be formed by a vacuum deposition method, a sputtering method, an ion plating method, a plating method, or the like. Further, it is important that there is an etchant that does not etch the transparent conductive film but etches the conductive electrode film layer itself. As a preferred example of the metal, aluminum, nickel, copper, silver, and the like may be used. In particular, a metal film made of copper foil having a thickness of 20 to 1000 nm is preferable in terms of electrical conductivity and light-excluding property, and can be easily etched by hydrogen peroxide solution in acid atmosphere, which does not etch the transparent conductive film. In addition, such a metal film is also preferred because it can be easily connected to the external circuit. Preferably, the thickness of the metal film is 30 nm or larger. More preferably, the thickness is 100 to 500 nm. It is because the light-excluding metal film layer 1 having a high electrical conductivity can be obtained by setting the thickness thereof to 100 nm or larger, and the light-excluding metal film layer 1 that can be easily handled and is superior in terms of processability can be obtained by setting the thickness thereof to 500 nm or smaller.

As the transparent conductive film 3, a layer made of a metal oxide such as indium tin oxide or zinc oxide may be used, and the transparent conductive film 3 can be formed by a vacuum deposition method, a sputtering method, an ion plating method, a plating method, or the like. The thickness thereof ranges from approximately tens to a few hundreds nanometers. It is necessary that the transparent conductive film 3 can be easily etched together with the light-excluding conductive electrode film 1 using a solution of ferric chloride or the like, but cannot be easily etched using the etching liquid for the light-excluding conductive electrode film layer 1 such as the hydrogen peroxide solution in acid atmosphere. Further, it is preferable for the transparent conductive film 3 to have a light transmittance of 80% or higher and a surface resistance of a few milliohms to a few hundred milliohms. In addition, it is possible to use a conductive polymer film such as thiophene or a conductive fiber film including metal nanowires or carbon nanotubes for the transparent conductive film 3. In this case, the transparent conductive film 3 can be formed by a printing method or an applying method.

It is preferable that the first resist layer 16 is made of a photoresist material such as tetramethylammonium hydroxide that can be exposed by a laser beam or a metal halide lamp and can be developed by an alkaline solution or the like. It is because the exposure and development using the photoresist material can securely form the fine wiring circuit pattern 10 having small width, so that the narrow frame touch input sheet 5 having a narrower frame can be manufactured. In addition, according to the present invention, since the light-excluding conductive electrode film layer 1 is formed as described above, if the first resist layer 16 is made of a photoresist material, the exposure and development can be performed simultaneously on the front surface and on the rear surface, so that the narrow frame touch input sheet 5 can be manufactured with a very high productivity. The first resist layer 16 can be formed through a general-purpose printing method such as gravure, screen, offset, or the like, or a method using any coater, an applying method, or a dipping method.

Material of the second resist layer 18 is not limited to a specific one as long as it is resistant to the etching liquid for the light-excluding conductive electrode film layer 1 such as hydrogen peroxide solution in acid atmosphere. In addition, the second resist layer 18 may remain permanently as a protection film except for the portion that serves as connection terminals with the external circuit 28. Therefore, unlike the first resist layer 16, the second resist layer 18 does not always have to be removed through development. Note that FIG. 1 illustrates the case where the second resist layer 18 is removed. As the material that may serve as a protection film, a thermosetting resin such as epoxy, urethane, or acrylic may be used, or an ultraviolet curing resin such as urethane acrylate or cyanoacrylate may be used. The same method for forming the first resist layer 16 can be adopted to form the second resist layer 18.

In addition, on this second resist layer 18, a design pattern layer may be formed so as to hide the fine wiring circuit pattern 10 and to improve exterior design. The design pattern layer may be formed by using polyvinyl, polyamide, polyacryl, polyurethane, or alkyd resin as a binder and using color ink containing appropriate color pigment or dye as a coloring agent. In addition, it is possible to use pearl pigment containing a coloring agent made of metal particles such as aluminum, titanium, or bronze, or mica on which titanium oxide is coated. The design pattern layer can be formed through a general-purpose printing method such as gravure, screen, or offset, any coating method, or an applying method.

(Second Embodiment)

In the example of the narrow frame touch input sheet described above, the circuit patterns and fine wiring circuit patterns are formed on the front and rear surfaces of the single transparent base sheet. However, the present invention is not limited to this structure.

Figure 3:
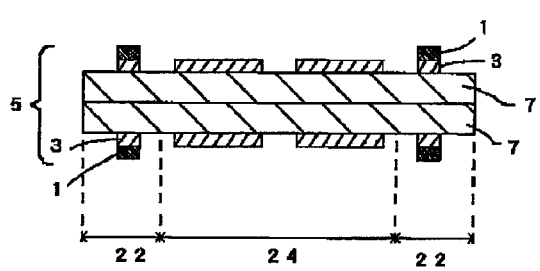
FIG. 3 is a schematic cross sectional view illustrating an example of a narrow frame touch input sheet according to the present invention, in which circuit patterns and fine wiring circuit patterns are formed on uppermost and lowermost surfaces of two layers of stacked transparent base sheets.
Figure 4A:
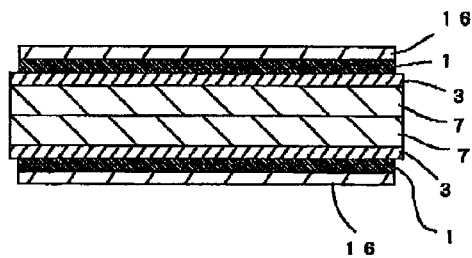
FIG. 4(a) is a schematic diagram illustrating a step of manufacturing the narrow frame touch input sheet.

For instance, the circuit pattern and the fine wiring circuit pattern 10 of the transparent conductive film 3 may be formed on the uppermost and lowermost surfaces of a plurality of transparent base sheets 7 that are stacked together (see FIG. 3). In order to obtain such a narrow frame touch input sheet, firstly, two base sheets 7 having a small thickness are used, and the transparent conductive film 3, the light-excluding conductive electrode film 1, and the first resist layer 16 are sequentially formed along the entire surface of one side of each of the base sheets 7. After that, the two base sheets 7 are stacked to be opposite to each other, so that the conductive sheet (see FIG. 4(a)) is obtained. As a method of stacking the base sheets 7, a heat laminate method and a dry laminate method using an adhesive layer may be used. When the base sheets 7 are stacked using the adhesive layer, it is possible to adjust the total thickness of the stacked body with the adhesive layer having a core.

Figure 4B:
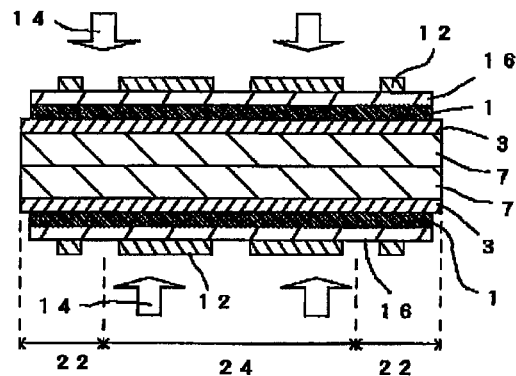
FIG. 4(b) is a schematic diagram illustrating a step of manufacturing the narrow frame touch input sheet.

Next, masks 12 having desired patterns are placed on the uppermost and lowermost surfaces of the two stacked transparent base sheets, and the first resist layers 16 are patterned through exposure and development (see FIG. 4(b)).

Figure 4C:
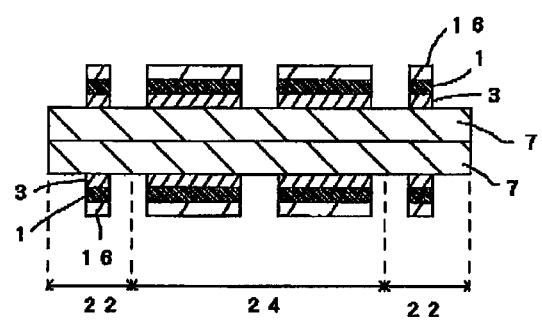
FIG. 4(c) is a schematic diagram illustrating a step of manufacturing the narrow frame touch input sheet.
Figure 4D:
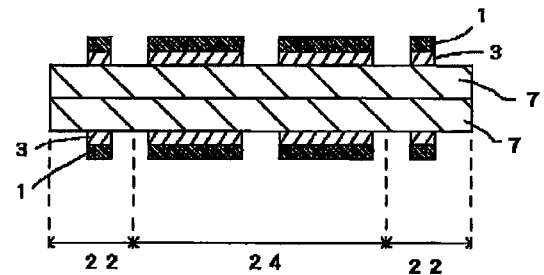
FIG. 4(d) is a schematic diagram illustrating a step of manufacturing the narrow frame touch input sheet.
Figure 4E:
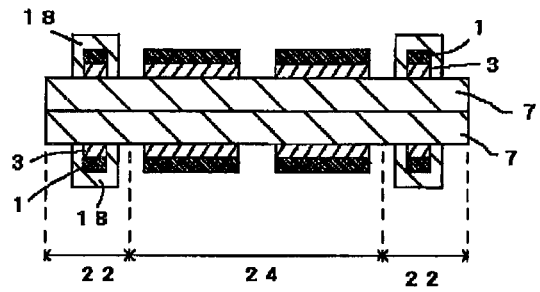
FIG. 4(e) is a schematic diagram illustrating a step of manufacturing the narrow frame touch input sheet.

Next, the transparent conductive film 3 and the light-excluding conductive electrode film 1 are etched simultaneously using an etching liquid such as ferric chloride so as to form a thin line pattern (see FIG. 4(c)). Next, the first resist layer 16 is stripped using the resist stripping liquid so that the light-excluding conductive electrode film 1 is exposed (see FIG. 4(d)). After that, a second resist layer 18 is formed only on the exposed light-excluding conductive electrode film 1 along the outer edge portion 22 (see FIG. 4(e)).

Figure 4F:
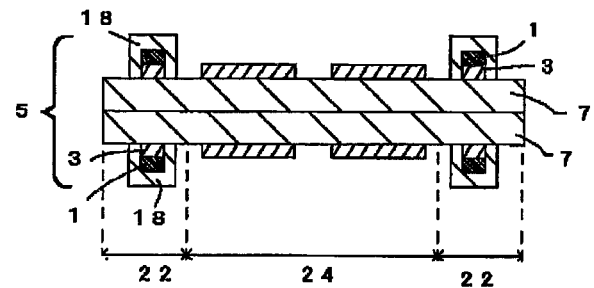
FIG. 4(f) is a schematic diagram illustrating a step of manufacturing the narrow frame touch input sheet.

Next, etching is performed using a special etching liquid such as acidified hydrogen peroxide. Then, the outer edge portion 22, on which the second resist layer 18 is formed, remains as is, while the light-excluding conductive electrode film 1 in the central window portion 24, in which the second resist layer 18 is not formed and the light-excluding conductive electrode film 1 is exposed, is removed by the etching, so that the transparent conductive film 3 thereunder is exposed (see FIG. 4(f)). The central window portion 24 becomes a display portion in which transparent conductive films are formed on both surfaces, while the light-excluding conductive electrode film 1 formed in the outer edge portion 22 and the transparent conductive film 3 formed thereunder with the same pattern become the fine wiring circuit pattern 10. Note that FIG. 3 illustrates the case where the second resist layer 18 is removed after the etching.

Figure 4G:
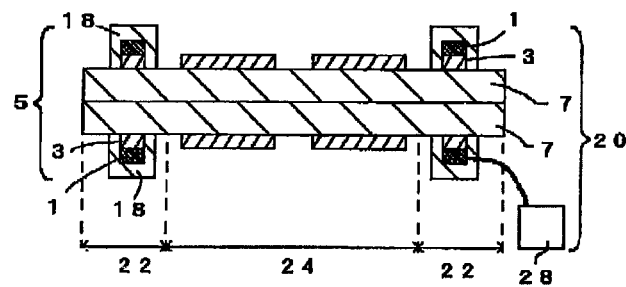
FIG. 4(g) is a schematic diagram illustrating a step of manufacturing the narrow frame touch input sheet.

The end portion of the fine wiring circuit pattern 10 formed on both surfaces of the narrow frame touch input sheet 5 obtained by the method described above is connected to an external circuit 28 that includes IC chips. Thus, the capacitive touch sensor 20 having the transparent conductive films 3 formed on both surfaces of the two stacked base sheets 7 is manufactured (see FIG. 4(g)).

<Variations>

In order to etch the above-mentioned transparent conductive film 3 and the light-excluding conductive electrode film 1 simultaneously and efficiently, it is necessary to use the ferric chloride solution having a fairly high concentration. If the cleansing with water is insufficient after the etching, there is a problem that the transparent conductive film 3 or the light-excluding conductive electrode film 1 would be eroded so that the electrical characteristic would be deteriorated when tested in an environment of high temperature and high humidity. Therefore, it is necessary to prevent the erosion in an application in which the wiring circuit is made of thin lines while low resistance must be maintained for a long term, and the transparent electrode is also required to be in a predetermined resistance range for a long term, like the narrow frame touch input sheet.

Figure 5:
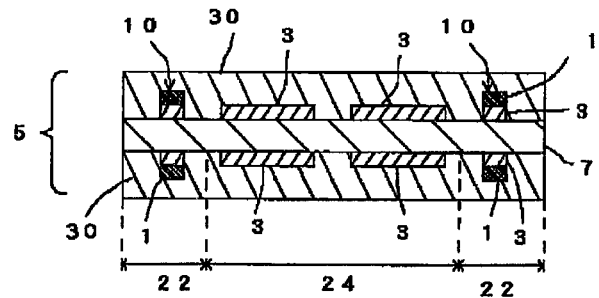
FIG. 5 is a schematic cross sectional view illustrating an example in which protection films are adhered to the narrow frame touch input sheet illustrated in FIG. 1.

As a measure against the erosion, it is preferred that the narrow frame touch input sheet of the present invention is further provided with transparent protection films adhered to both surfaces of the above-mentioned structure (see FIG. 5). It is preferred that the transparent protection film 30 is good in terms of moisture resistance and is made of a film having optical isotropy such that a retardation value in the central window portion of the narrow frame touch input sheet can be 20 nm or smaller. It is because, if the retardation value is a large value above 20 nm, emitting light and transmitting light from the touch input sheet would split into two light waves having oscillation directions perpendicular to each other, and a phase shift of the light wave would be generated so that the color of the emitting light from the touch input sheet would be changed, or that color shading may occur.

As a material suitable for the transparent protection film 30, cyclic olefin resin, polyethersulphon resin, polyarylate resin, amorphous polyolefin resin, and the like may be used. Among them, the cyclic olefin resin has a high glass transition temperature and a low photoelastic coefficient so that it is optimal as a material in which a stable retardation value can be obtained.

The thickness of the transparent protection film 30 may be selected appropriately within the range of 10 to 500 µm. If the thickness is smaller than 10 µm, it becomes difficult for the film to serve as the protection film for improving the resistance. If the thickness is larger than 500 µm, it becomes difficult to set the retardation value in the central window portion to 20 nm or smaller.

The method of adhering the transparent protection film 30 is not limited to the heat laminate method or the lamination with adhesive. In addition, it is possible to adhere the transparent protection films 30 having different material or thickness to the light-excluding electrode conductive film layer 1 and the transparent conductive film 3, respectively.

Note that the retardation (birefringence) means a phenomenon in which the light entering a crystal or other anisotropic substance is split into two light waves having oscillation directions that are orthogonal to each other. When non-polarized light enters a material having birefringence, the incident light is split into two, which have oscillation directions that are orthogonal to each other. One of them is referred to as vertically polarized light, and the other is referred to as horizontally polarized light. The vertically polarized light becomes an extraordinary ray, while the horizontally polarized light becomes an ordinary ray. The ordinary ray has a propagation rate that does not depend on a propagation direction. The extraordinary ray has a propagation rate that varies depending on the propagation direction. The birefringence material has a direction in which the two rays have the same rate, and the direction is referred to as an optical axis. The retardation value Δnd is expressed by Δnd=(nx−ny)d. Here, d denotes the thickness of a test sample, and nx and ny denote refractive indexes of the test sample.

Figure 6:
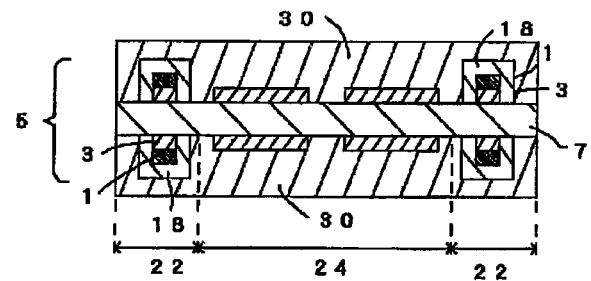
FIG. 6 is a schematic cross sectional view illustrating an example in which protection films are adhered to the narrow frame touch input sheet illustrated in FIG. 2(e)
Figure 7:
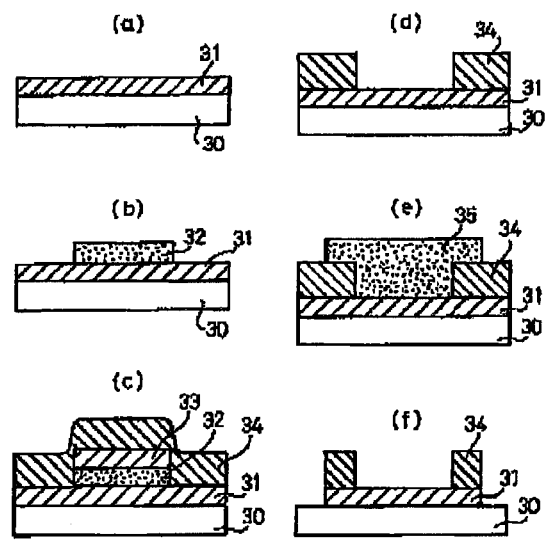
FIG. 7 is a diagram illustrating an electrode forming step of the touch input device described in JP-A-108264.

Note that also in the case where the second resist layer 18 is not stripped, the second resist layer 18 is deteriorated or swelled slightly by the special etching liquid, so that it is insufficient to protect the transparent conductive film 3 and the light-excluding conductive electrode film 1 for a long term. Therefore, the transparent protection film 30 covers not only the exposed transparent conductive film 3 but also the light-excluding conductive electrode film 1 so that further protection can be achieved (see FIG. 6).

EXAMPLE 1

(1) Manufacturing of the Narrow Frame Touch Input Sheet

As the base sheet, a colorless and transparent soda glass plate having a thickness of 1 mm was used. On the front and rear surfaces of the base sheet, the transparent conductive films made of indium tin oxide were formed through sputtering method to have a thickness of 200 nm. On them, copper films were formed as the light-excluding conductive electrode films through sputtering method to have a thickness of 500 nm. On them, tetramethylammoniumhydrooxide layers were formed as the first resist layers through spin coating. The mask having an X direction electrode pattern was placed on the front side, while the mask having a Y direction electrode pattern was placed on the rear side. Then, the front and rear surfaces were exposed simultaneously using a metal halide lamp, and were developed in alkali solution.

Next, the indium tin oxide film and the copper film were etched simultaneously using ferric chloride etching liquid. Then, in the central window portion, the X direction electrode pattern was exposed on the front side, while the Y direction electrode pattern was exposed on the rear side. In the outer edge portion surrounding the central window portion, thin wiring patterns having an average line width of 20 μm were exposed on the front and rear surfaces. Next, thermosetting acrylic resin layers were formed as the second resist layers to cover the thin wiring patterns through screen printing to have a thickness of 10 nm. Next, dipping in the hydrogen peroxide solution in acid atmosphere, the exposed copper film in the exposed central window portion was etched and removed, so that only the indium tin oxide film formed thereunder remained.

(2) Manufacturing and Evaluation of the Capacitive Touch Sensor

By the method described above, the narrow frame touch input sheet having the following structure was obtained. Only the indium tin oxide films of the X direction electrode pattern and the Y direction electrode pattern are formed in the central window portion, on both surfaces of the base sheet. In the outer edge portion of each side, the fine wiring circuit is formed in which the copper film having the same pattern is formed on the indium tin oxide film, which is covered with the thermosetting acrylic resin layer. The end portion of the fine wiring circuit pattern formed on the narrow frame touch input sheet was connected to the external circuit that includes IC chips, so as to evaluate the performance as the capacitive touch sensor. A good result was obtained. In addition, light transmittance in the central window portion was measured, and a good value of 90% was obtained.

EXAMPLE 2

Two colorless polyester films having a thickness of 200 μm were used as the base sheets. On one surface of each base sheet, the transparent conductive film, the light-excluding conductive electrode film, the first resist layer, and the second resist layer were formed sequentially. The base sheets were stacked so as to be opposite to each other, so that the transparent conductive film, the light-excluding conductive electrode film, and the first resist layer were formed on both surfaces of the stacked base sheets. After that, the X direction electrode pattern was formed on the front surface in the central window portion, and the Y direction electrode pattern was formed on the rear surface in the central window portion. Other than that, the same method as in Example 1 was used, and the narrow frame touch input sheet was obtained. The end portion of the fine wiring circuit pattern formed on the narrow frame touch input sheet was connected to the external circuit that includes IC chips, so as to evaluate the performance as the capacitive touch sensor. A good result was obtained similarly to Example 1.

EXAMPLE 3

A colorless and transparent polyester film having a thickness of 100 μm was used as the base sheet. On the front and rear surfaces of the base sheet, the transparent conductive film made of indium tin oxide having a thickness of 200 nm was formed through sputtering method. On the transparent conductive film, a copper film was formed as the light-excluding conductive electrode film through sputtering method to have a thickness of 300 nm. On the copper film, the first resist layer made of novolac resin was formed through gravure coating. The mask having the X direction electrode pattern was placed on the front side, while the mask having the Y direction electrode pattern was placed on the rear side. The front and rear surfaces were exposed simultaneously using a metal halide lamp, and were developed in alkali solution.

Next, the indium tin oxide film and the copper film were etched simultaneously using the ferric chloride etching liquid. Then, in the central window portion, the X direction electrode pattern was exposed on the front side, while the Y direction electrode pattern was exposed on the rear side. In the outer edge portion surrounding the central window portion, thin wiring patterns having an average line width of 20 μm were exposed on the front and rear surfaces. Next, a thermosetting acrylic resin layer were formed as the second resist layer to cover the thin wiring patterns through screen printing to have a thickness of 10 μm. Next, dipping in the hydrogen peroxide solution in acid atmosphere, the exposed copper film in the exposed central window portion was etched and removed, so that only the indium tin oxide film formed thereunder remained.

Next, the transparent protection films made of cyclic olefin resin having a thickness of 50 μm were adhered to both surfaces with acrylic adhesive, so as to cover the transparent electrode pattern in the central window portion and the thermosetting acrylic resin layer in the outer edge portion on each side. By the method described above, the narrow frame touch input sheet having the following structure was obtained. Only the indium tin oxide films of the X direction electrode pattern and the Y direction electrode pattern are formed in the central window portion, on both surfaces of the base sheet. In the outer edge portion of each side, the fine wiring circuit is formed in which the copper film having the same pattern is formed on the indium tin oxide film, which is covered with the thermosetting acrylic resin layer. The transparent electrode pattern and the thermosetting acrylic resin layer on each side are covered with the transparent protection film.

The end portion of the fine wiring circuit pattern formed on the obtained narrow frame touch input sheet was connected to the external circuit that includes IC chips, so as to evaluate the performance as the capacitive touch sensor for long term. A result was obtained indicating that a stable electrical characteristic can be maintained. In addition, a retardation value in the central window portion was measured, and was found to be 20 nm. Problems such as color shading did not occur.

EXAMPLE 4

Two colorless and transparent polyester films having a thickness of 38 μm were used as the base sheets. On one surface of each base sheet, the transparent conductive film, the light-excluding conductive electrode film, the first resist layer, and the second resist layer were formed sequentially. The base sheets were stacked so as to be opposite to each other so that the transparent conductive film, the light-excluding conductive electrode film, and the first resist layer were formed on both surfaces of the stacked base sheets. Then, the X direction electrode pattern was formed on the front surface in the central window portion, and the Y direction electrode pattern was formed on the rear surface in the central window portion. After that, the transparent protection film made of cyclic olefin resin having a thickness of 30 is adhered only to the electrode pattern on the surface in the central window portion of each side. Other than that, the same method as in Example 3 was used, and the narrow frame touch input sheet was obtained. The end portion of the fine wiring circuit pattern formed on the narrow frame touch input sheet was connected to the external circuit that includes IC chips, so as to evaluate the performance as the capacitive touch sensor for a long term. A result was obtained indicating that a stable electrical characteristic can be maintained. In addition, a retardation value in the central window portion was measured, and was found to be 10 nm. Problems such as color shading did not occur.

The present invention has been fully described with reference to the attached drawings related to the preferred embodiments, but various variations and modifications thereof would be apparent for a skilled person in the art. It should be understood that such variations and modifications are included in the scope of the present invention as defined by the attached claims unless they deviate from the scope.

The present invention may be used in the narrow frame touch input sheet that can be applied to an input device of a cellular phone, a PDA, or a small PC, which has a display screen such as a liquid crystal panel.

What is claimed is:

1. A method for manufacturing a narrow frame touch input sheet, comprising:
    forming and stacking transparent conductive films, light-excluding conductive electrode films, and first resist layers sequentially on both surfaces of a transparent base sheet;
    exposing and developing the first resist layers simultaneously on the both surfaces;
    etching the transparent conductive films and the light-excluding conductive electrode films on the both surfaces;
    stripping the first resist layers so as to form a fine wiring circuit pattern with the stacked transparent conductive film and light-excluding conductive electrode film in an outer edge portion on each of the two surfaces of the base sheet;
    forming a second resist layer to cover the fine wiring circuit pattern on each surface of the base sheet; and
    etching only the light-excluding electrode conductive film layer on which the second resist layer is not formed, so that a circuit pattern of the transparent conductive film is exposed in a central window portion on each surface of the base sheet.

2. The method for manufacturing a narrow frame touch input sheet according to claim 1, wherein
    the etching etches the transparent conductive films and the light-excluding conductive electrode films on the both surfaces simultaneously.

3. The method for manufacturing a narrow frame touch input sheet according to claim 2, further comprising
    forming a design pattern layer onto the second resist layer after the circuit pattern is exposed.

4. The method for manufacturing a narrow frame touch input sheet according to claim 2, further comprising
    removing the second resist layer after the circuit pattern is exposed.

5. The method for manufacturing a narrow frame touch input sheet according to claim 2, further comprising
    adhering a transparent protection film to the circuit pattern in the central window portion on each surface of the base sheet after the circuit pattern is exposed.

6. The method for manufacturing a narrow frame touch input sheet according to claim 5, further comprising
    adhering the transparent protection film to the fine wiring circuit pattern on each surface of the base sheet.

7. The method for manufacturing a narrow frame touch input sheet according to claim 1, further comprising
    forming a design pattern layer onto the second resist layer after the circuit pattern is exposed.

8. The method for manufacturing a narrow frame touch input sheet according to claim 1, further comprising
    removing the second resist layer after the circuit pattern is exposed.

9. The method for manufacturing a narrow frame touch input sheet according to claim 1, further comprising
    adhering a transparent protection film to the circuit pattern in the central window portion on each surface of the base sheet after the circuit pattern is exposed.

10. The method for manufacturing a narrow frame touch input sheet according to claim 9, further comprising
    adhering the transparent protection film to the fine wiring circuit pattern on each surface of the base sheet.

11. A method for manufacturing a narrow frame touch input sheet, comprising:
    forming and stacking a transparent conductive film, a light-excluding conductive electrode film, and a first resist layer sequentially on each of two transparent base sheets;
    stacking the base sheets to be opposite to each other so that the transparent conductive films, the light-excluding conductive electrode films, and the first resist layers are formed on both surfaces of the stacked base sheets;
    exposing and developing the first resist layers simultaneously on the both surfaces;
    etching the transparent conductive films and the light-excluding conductive electrode films on the both surfaces;
    stripping the first resist layers so as to form a fine wiring circuit pattern with the sequentially stacked transparent conductive film and light-excluding conductive electrode film in an outer edge portion on each of the two surfaces of the stacked base sheets;

forming a second resist layer to cover the fine wiring circuit pattern on each surface of the stacked base sheets; and etching only the light-excluding conductive electrode film layer in a central window portion on which the second resist layer is not formed on each surface of the stacked base sheets, so that a circuit pattern of the transparent conductive film is exposed.

12. The method for manufacturing a narrow frame touch input sheet according to claim 11, wherein the etching etches the transparent conductive films and the light-excluding conductive electrode films on the both surfaces simultaneously.

13. The method for manufacturing a narrow frame touch input sheet according to claim 12, further comprising forming a design pattern layer onto the second resist layer after the circuit pattern is exposed.

14. The method for manufacturing a narrow frame touch input sheet according to claim 12, further comprising removing the second resist layer after the circuit pattern is exposed.

15. The method for manufacturing a narrow frame touch input sheet according to claim 12, further comprising adhering a transparent protection film to the circuit pattern in the central window portion on each surface of the stacked base sheets after the circuit pattern is exposed.

16. The method for manufacturing a narrow frame touch input sheet according to claim 15, further comprising adhering the transparent protection film to the fine wiring circuit pattern on each surface of the stacked base sheets.

17. The method for manufacturing a narrow frame touch input sheet according to claim 11, further comprising forming a design pattern layer onto the second resist layer after the circuit pattern is exposed.

18. The method for manufacturing a narrow frame touch input sheet according to claim 11, further comprising removing the second resist layer after the circuit pattern is exposed.

19. The method for manufacturing a narrow frame touch input sheet according to claim 11, further comprising adhering a transparent protection film to the circuit pattern in the central window portion on each surface of the stacked base sheets after the circuit pattern is exposed.

20. The method for manufacturing a narrow frame touch input sheet according to claim 19, further comprising adhering the transparent protection film to the fine wiring circuit pattern on each surface of the stacked base sheets.

* * * * *